(12) United States Patent  
Scroggie

(10) Patent No.: US 7,152,281 B2
(45) Date of Patent: Dec. 26, 2006

(54) FASTENER AND FASTENED ASSEMBLY

(75) Inventor: Derek Scroggie, Macomb, MI (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 11/116,864

(22) Filed: Apr. 28, 2005

(65) Prior Publication Data
US 2006/0242802 A1 Nov. 2, 2006

(51) Int. Cl.
F16B 19/00 (2006.01)

(52) U.S. Cl. .............................. 24/297; 24/458; 24/292; 24/289; 411/508; 411/509; 411/510; 411/913

(58) Field of Classification Search ................. 24/458, 24/297, 291, 292, 289; 411/508, 913, 509, 411/510; 248/231.9
See application file for complete search history.

(56) References Cited

U.S. PATENT DOCUMENTS

| 4,927,306 A | * | 5/1990 | Sato ........................... 411/182 |
| 5,507,610 A | * | 4/1996 | Benedetti et al. ........... 411/339 |
| 5,897,278 A | * | 4/1999 | Frattarola ................... 411/549 |
| 6,572,317 B1 | * | 6/2003 | Okada et al. ............... 411/508 |
| 6,594,870 B1 | * | 7/2003 | Lambrecht et al. ........... 24/297 |
| 6,715,185 B1 | * | 4/2004 | Angellotti ..................... 24/297 |
| 6,805,524 B1 | * | 10/2004 | Kanie et al. ................. 411/174 |
| 2003/0159256 A1 | * | 8/2003 | Clarke .......................... 24/297 |

* cited by examiner

Primary Examiner—Robert J. Sandy
Assistant Examiner—Marcus Menezes
(74) Attorney, Agent, or Firm—Mark W. Croll; Paul F. Donovan

(57) ABSTRACT

A fastener for connecting a first component to a second component includes a first component connecting end allowing relative movement between a first component connected thereto and the fastener during assembly and during conditions of expansion and contraction. A second component connecting end of the fastener is configured for connecting to a second component.

22 Claims, 2 Drawing Sheets

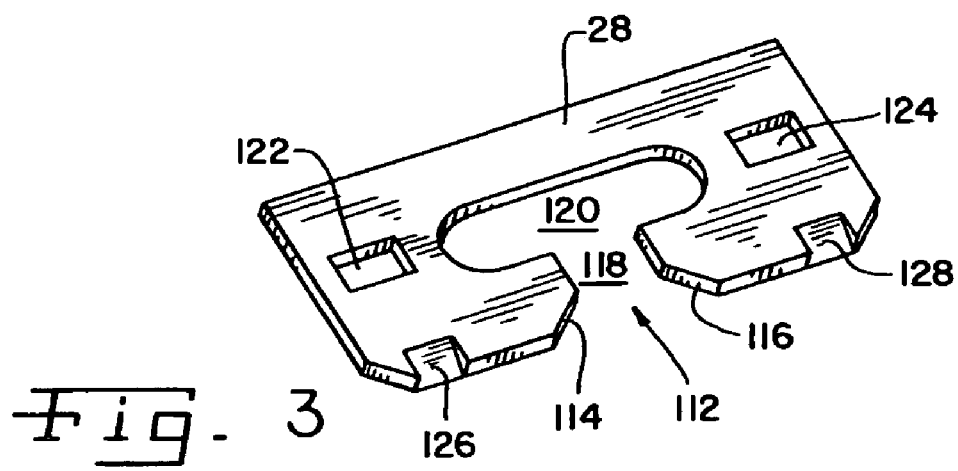
Fig. 3
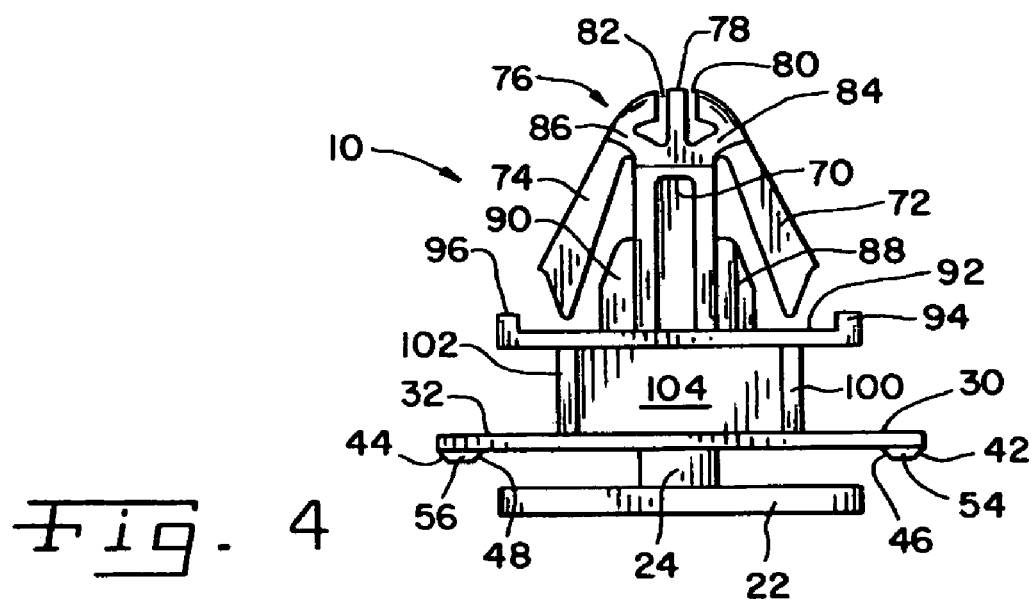
Fig. 4
Fig. 5

FASTENER AND FASTENED ASSEMBLY

FIELD OF THE INVENTION

The present invention relates generally to fasteners used as an intermediate connector between first and second components; and, more particularly, the invention pertains to fasteners used to connect panels in automobile assemblies to panel moldings and trim pieces.

BACKGROUND OF THE INVENTION

In many assemblies it is necessary to connect one panel or object to another panel or object. For example, in the assembly of automobiles various panels and structures are connected to other panels or structures, or to the automobile frame. To facilitate assembly, it is known to use snap-together type fasteners. Also it is known to preassemble the fastener with one of the components, and to thereafter connect the second component to the fastener during final assembly. It is also known to use a plurality of such fasteners when connecting relatively large components together. Fasteners of this general type have been provided in a variety of shapes and configurations suitable for the particular components to be connected. While such fasteners have been used successfully, use of such fasteners is not without problems or difficulties entirely.

The parts connected by fasteners of this type are often manufactured in different facilities by different manufacturing techniques. Fasteners connected to one component can become dislodged during shipping and handling prior to connecting to the other component. The components may be made of different materials. For example, one component may be metal and the other plastic. Because of the different manufacturing techniques and the stack up of tolerances in the assemblies, the holes or openings in one component may not align precisely with the holes or openings in the other component to which it is to be connected. The fastener must compensate for such discrepancies.

Changes in environmental conditions due to operation of the vehicle and/or climate changes cause material expansion or contraction. One component may expand or contract more or less than the other component, due to the different materials used for each component, differences in size and mass of the two components and the like. Again, the fastener must compensate for such changes, to prevent cracking, dimpling, wrinkling or other damage to one or both components. Accordingly, it is necessary that the fastener float with respect to the components to which it is connected. However, the fastener also should remain securely connected to each component, so that one component does not completely disconnect from the other component. Further, it is desirable that the fastener connect readily and easily to each component to facilitate assembly and improve efficiency. However, once assembled, the fastener should not disassemble easily, but should remain connected securely to each component. Achieving these desirable features in a single fastener has been difficult.

Known fasteners of the type generally described have not been symmetric. Non-symmetric fasteners require the assembler to obtain and properly orient the fastener in the single position suitable for assembly. This decreases assembly efficiency. Accordingly, it is desirable that a fastener be symmetric, requiring minimal orientation by the assembler during the assembly process.

SUMMARY OF THE INVENTION

The present invention provides a symmetrical fastener having locking features cooperating with the components it connects to attach easily, yet lock securely to each component, while allowing the fastener to float with respect to at least one of the components during assembly or during conditions of significant thermal expansion or contraction.

In one aspect thereof, the present invention provides a fastener for joining a first component to a second component, with a first connecting end configured for connection to a first component and a second connecting end configured for connection to a second component. The first connecting end includes a base and a plate in spaced relation, and a post connected to and extending between the base and the plate. The plate has deflectable end portions on opposite ends thereof, and a surface facing the base. First and second knobs project from the surface at the first and second deflectable end portions. Each knob has an angular outer face and an angular inner face.

In another aspect thereof, the present invention provides a fastened assembly with a first component having a slot and a window, and a fastener having a first component connecting end connected to the first component. The first component connecting end includes a base on one side of the first component, and a plate in spaced relation to the base, the plate being disposed on an opposite side of the first component from the base. A post is connected to and extends between the base and the plate. The post is disposed in the slot. A knob on the plate is disposed in the window. The knob has an angular inner face and an angular outer face, and first and second side faces, at least one side face being substantially perpendicular to the plate.

In a still further aspect thereof, the present invention provides an assembly for securing first and second components to each other. The assembly has a first component including a panel segment with an edge, a keyhole opening in the panel segment including an entrance thereto along the edge and a slot opening from the entrance. First and second windows are on opposite ends of the slot and spaced from the slot. First and second ramps along the edge are aligned with the first and second windows, respectively. A fastener has a first component connecting end connected to the first component, and a second component connecting end configured for connection to a second component. The first component connecting end includes a base on one side of the panel segment, and a plate in spaced relation to the base. The plate is disposed on an opposite side of the panel segment from the base. The plate has first and second deflectable portions. A post is connected to and extends between the base and the plate. The post is disposed in the slot. First and second knobs on the first and second deflectable portions are disposed in the first and second windows, respectively. Each the knob has an angular inner face and an angular outer face substantially aligned with the windows and the slot. Each the knob has a first side face and a second side face extending between the inner and outer faces of the knob. At least one side face on each knob is substantially perpendicular to the plate.

An advantage of the present invention is providing a fastener that is symmetric, requiring only minimal orientation for proper assembly.

Another advantage of the present invention is providing a fastener that floats with respect to at least one of the components, allowing for assembly of slightly misaligned components and compensating for thermal expansion or contraction of the components.

Another advantage of the present invention is providing a fastener that connects to the components easily yet securely, reducing the possibility of the fastener becoming disassembled.

Other features and advantages of the invention will become apparent to those skilled in the art upon review of the following detailed description, claims and drawings in which like numerals are used to designate like features.

BRIEF DESCRIPTION OF THE DRAWINGS

FIG. 3 is a perspective view of a component to which the fastener can be connected;

FIG. 4 is an elevational view of the fastener, showing the side of the fastener opposite the side shown most fully in FIGS. 1 and 2; and FIG. 5 is an enlarged, fragmentary view of a portion of the fastener.

Figure 1:
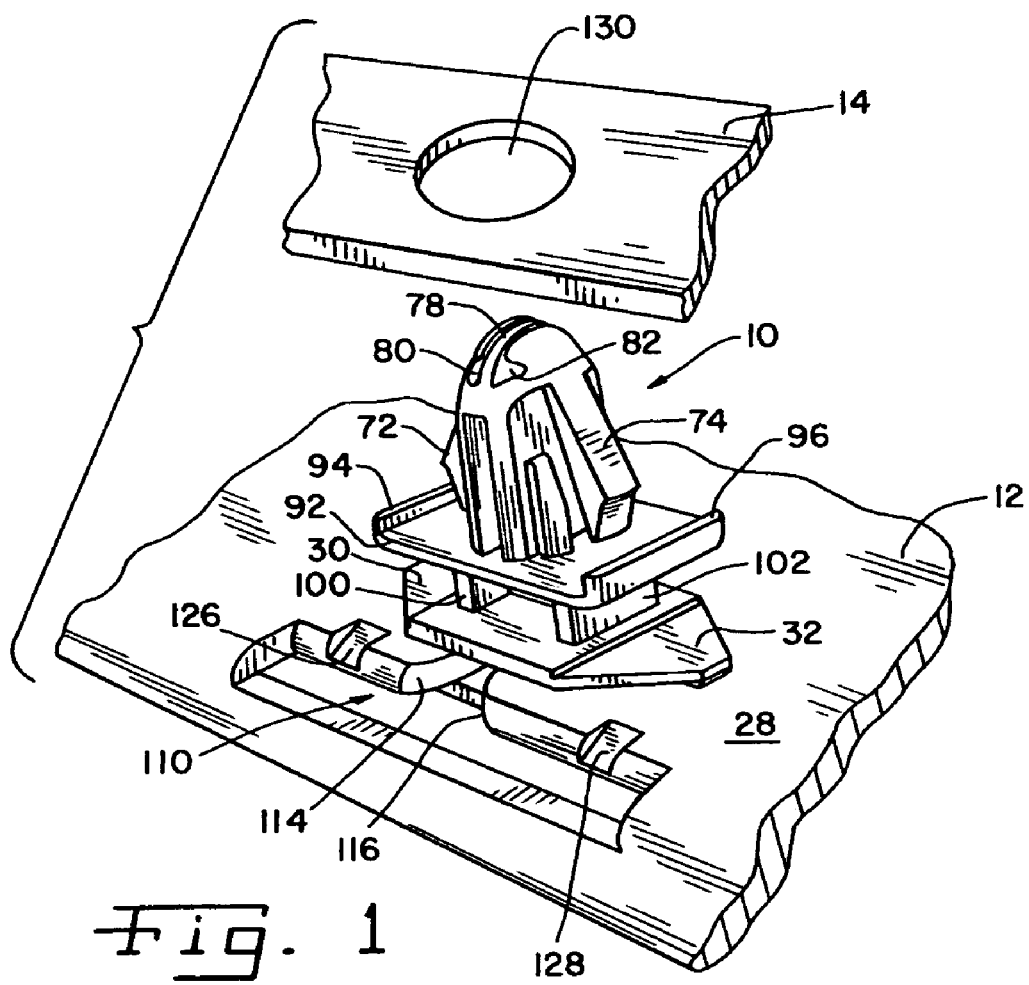
FIG. 1 is a fragmentary, perspective, partially exploded view of an assembly showing a fastener in accordance with the present invention connected to one component and a second component positioned for connection to the fastener.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a fastener in accordance with the present invention. Fastener 10 secures a first component 12, such as a rocker molding, to a second component 14 such as a panel, trim piece or the like. One advantageous use of the present invention is for fastening body side moldings to body panels on automobiles. However, it should be understood that fasteners in accordance with the present invention can be used for fastening together various other components. Fasteners of the present invention can be used in the assembly of automobiles for fastening various moldings and trim pieces to structural panels or other components. Fasteners of the present invention also can be used for fastening components in assemblies other than automobiles. Use in the assembly of automobiles is only one advantageous use of the present invention.

Fastener 10 can be made of different materials, such as various thermoplastics or thermoset materials. Fastener 10 can be made by various molding processes, including overmolding processes, and can be formed as a one-piece, monolithic body. Fastener 10 also can be assembled from discrete parts. Within the scope of the present invention, fastener 10 can be of different sizes and configurations for attachment to different types of first and second components 12 and 14. Accordingly, the present invention can be used advantageously in a variety of blind attachment configurations.

Fastener 10 includes a first component connecting end 16 configured to cooperate with first component 12, for securing fastener 10 to first component 12. Fastener 10 also includes a second component connecting end 18 configured for cooperating with second component 14, for connecting fastener 10 to second component 14. Thus, with fastener 10 connected to each first component 12 and second component 14, the first and second components are secured one with respect to the other through the intermediate connection performed by fastener 10. Fastener 10 further includes an intermediate structure 20 between first component connecting end 16 and second component connecting end 18, to provide necessary spacing or separation between connecting end 16 and connecting end 18. Thus, depending on the application and use of fastener 10, intermediate structure 20 may be larger or smaller to provide the necessary separation, which may be great or minimal. In some uses of the present invention little or no separation is required between connecting ends 16 and 18, and no intermediate structure 20 is required First component connecting end 16 includes a base 22, a post 24 extending from one face of base 22 and a plate 26 at an end of post 24 opposite base 22. Base 22 and plate 26 are held in spaced relation to each other by post 24. Base 22 and plate 26 are configured to be disposed along opposite faces of a panel or panel segment 28 of first component 12. Post 24 is of appropriate length so that the space between base 22 and plate 26 is substantially the thickness of panel or panel segment 28. Base 22 can be of various shapes.

Plate 26 includes first and second deflectable end portions 30, 32, respectively. In the exemplary embodiment shown, first and second end portions 30, 32 are more narrow toward outer edges 34, 36 of end portions 30, 32 than at more central portions of plate 26. However, it should be understood that other configurations for first and second end portions 30, 32 also can be used.

First and second end portions 30, 32 have a first knob 38 and a second knob 40, respectively, projecting from a surface of plate 26 that faces toward base 22. First and second knobs 38, 40 are similarly shaped, and will be described more fully with reference to the enlarged view of first knob 38, shown in FIG. 5.

First and second knobs 38, 40 include angular outer faces 42, 44 respectively, which slant inward from outer edges 34, 36, respectively. Knobs 38, 40 further include angular inner faces 46, 48, respectively, slanting generally outward at the inner most ends of knobs 38 and 40. Each knob 38, 40 further includes a first side face 50, 52, respectively, and a second side face 54, 56, respectively, between the inner and outer faces thereof. Side faces 50, 52, 54, 56 are substantially perpendicular to plate 26.

In the exemplary embodiment, second component connecting end 18 is a so-called "W-connector" having a center structure 70, with first and second lateral wings 72, 74 projecting from a tip 76 of center portion 70. However, it should be understood that second component connecting end 18 can be of other configurations for connecting to different types and configurations of second component 14. The exemplary W-connector is merely one suitable configuration.

In the exemplary embodiment, center portion 70 is configured as a double-ribbed post, but may be of other configurations as well. Tip 76 includes a center pin 78 between first and second slots 80, 82, although center pin 78 is not required for alternative embodiments. Slots 80, 82 define independent hinges 84, 86 to which first and second lateral wings 72, 74 are connected. First and second wings 72, 74 thereby are relatively independently deflectable for facilitating installation.

To further rigidify center portion 70, first and second shear load ribs 88, 90 are provided. Center portion 70 and shear load ribs 88, 90 project from an intermediate collar 92, which defines a transitional structure between second component connecting end 18 and intermediate structure 20. Collar 92 has first and second standoff ribs 94, 96 configured to engage against a surface of second component 14. In some uses of the present invention, standoff ribs 94, 96 are not required, and collar 92 engages flush against second component 14. Standoff ribs 94, 96 can be used particularly advantageously with the optional use of a sealing member 98, and can thereby control the compression of sealing member 98 for optimal compression and for sealing against water, noise, dust, vapors and the like as desired.

In the exemplary embodiment, intermediate structure 20 is disposed between collar 92 and plate 26. Intermediate structure 20 is an H-like structure having transverse ribs 100, 102 and a center rib 104. Other configurations for intermediate structure 20 also can be used.

First component 12 as shown in the exemplary embodiment of FIG. 1 defines a slot-like opening 110 or pocket for receiving and engaging first component connecting end 16 and specifically base 22 thereof. However, it should be understood that first component 12 can include a simple panel-like structure as shown in FIG. 3. Further, a panel structure 28 as shown in FIG. 3 can be separately and independently connected to first component 12, such as by welding or other suitable fastening procedure.

First component 12 defines a keyhole opening 112 which may include tapered inlet sides 114, 116 leading to a narrowed throat 118 opening into an enlarged slot 120. Keyhole opening 112 is configured to receive post 24 with slight interference or minimal clearance in throat 118. First component 12 further defines windows 122, 124 at opposite ends of and spaced from slot 120. Windows 122 and 124 are configured and arranged to receive first and second knobs 38, 40, respectively. Lead-in ramps 126, 128 are provided at a forward edge of first component 12, providing paths by which knobs 38 and 40 slide up, onto and along first component 12.

Second component 14 defines an opening 130 therein, which may be a circular hole or other opening for engaging second component connecting end 18 of fastener 10.

Figure 2:
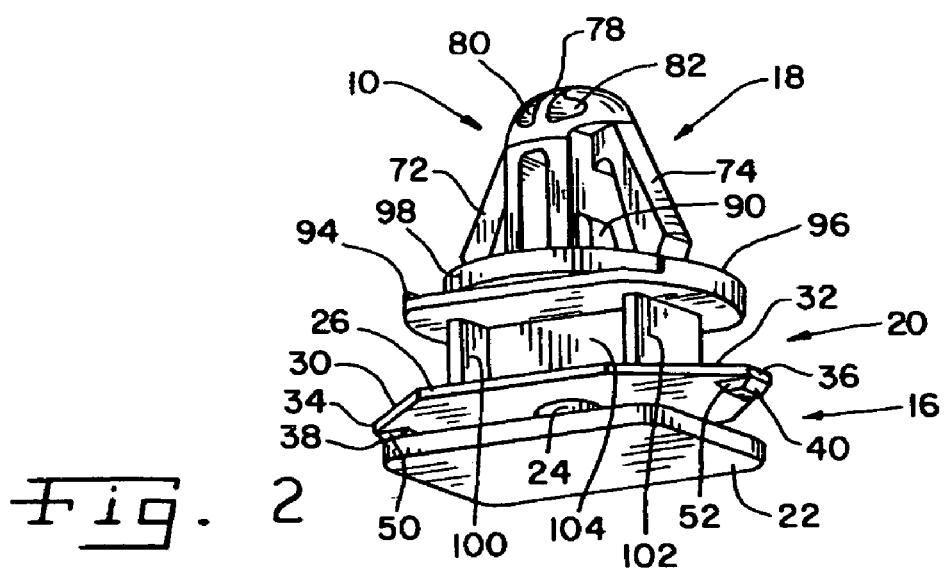
FIG. 2 is a perspective view of the fastener shown in FIG. 1.

Fastener 10 is symmetric, as is apparent from a comparison of FIGS. 2 and 4, which show opposite sides of fastener 10. Accordingly, either side of fastener 10 can be oriented as the inner or outer side of fastener 10 with respect to keyhole opening 112.

In the use, fastener 10 is first connected to first component 12 by inserting post 24 into keyhole opening 112. Lead-in surfaces 114 and 116 facilitate proper location of fastener 10 relative to panel or panel segment 28. Fastener 10 is inserted with base 22 on one side of panel or panel segment 28 and plate 26 on the opposite side of panel or panel segment 28. As fastener 10 is inserted, knobs 38 and 40 encounter ramps 126 and 128. The ramps cause first and second end portions 30 and 32 to be deflected away from base 22 as knobs 38 and 40 ride up ramps 126 and 128 and over the surface of panel or panel segment 28. Through proper selection of the diameter for post 24 and the width of throat 118, a desired degree of resistance is created as fastener 10 is inserted. Once post 24 clears throat 118, resistance suddenly decreases, signifying full and adequate insertion. As post 24 enters slot 120, knobs 38 and 40 slide over windows 122 and 124. The natural resiliency of deflected end portions 30 and 32 causes the end portions to rebound to their natural flat orientation, and knobs 38 and 40 project into windows 122 and 124. Thus, fastener 10 is automatically locked into position relative to first component 12. With knobs 38 and 40 projecting into windows 122 and 124, fastener 10 cannot become dislodged without deflecting end portions 30 and 32 away from panel or panel segment 28.

The symmetrical configuration of fastener 10 allows fastener 10 to be secured to first component 12 whether knob 38 is aligned with ramp 126 and knob 40 with ramp 128, or knob 38 with ramp 128 and knob 40 with ramp 126. Accordingly, assembly is facilitated in that the assembler need only orient the fastener end for end and align one or the other of first and second end portions 30 and 32 with one or the other of ramps 126 and 128. It is not necessary that end portions 30 and 32 be aligned with a specific ramp 126 or 128.

Knobs 38 and 40 in windows 122 and 124 generally secure fastener 10 relative to first component 12. However, a desired amount of float can be created between fastener 10 and first component 12 through the selection of the size of knobs 38 and 40 relative to the dimensions of windows 122 and 124. Float in both directions, side-to-side and end-to-end, is controlled by the fit of knobs 38 and 40 in windows 122 and 124 as well as the fit of post 24 within slot 120.

Second component 14 is connected to fastener 10 by generally aligning opening 130 with tip 76 and pushing the components toward each other. As opening 130 is forced onto and over second component connecting end 18, wings 72 and 74 are deflected inwardly. If necessary, fastener 10 can slide slightly, with post 24 moving within slot 120 and knobs 38 and 40 moving in windows 122 and 124. However, because of the relatively flat orientation of first side faces 50 and 52 and second side faces 54 and 56 of knobs 38 and 40, knobs 38 and 40 stay within windows 122 and 124, and fastener 10 does not become dislodged easily from first component 12. When second component 14 is fully inserted onto second component connecting end 18, wings 72 and 74 rebound outwardly beyond opening 130 to secure attachment of second component 14 to fastener 10.

The elongated nature of trim pieces tends to cause thermal expansion and contraction in the axial or longitudinal direction of the trim piece. If fasteners 10 are oriented on first component 12 such that first and second end portions 30 and 32 are generally aligned in the direction of thermal expansion and contraction, fasteners 10 can compensate for such expansion or contraction and adjust in position. Angular outer faces 42, 44 and angular inner faces 46, 48 allow end portions 30 and 32 to move beyond the normal positions by allowing knobs 38 and 40 to ride outwardly of windows 122 and 124. However, even if fastener 10 slides axially such that knobs 38 and 40 ride out of windows 122 and 124, fasteners 10 remains securely connected to first component 12. In such condition, post 24 will have moved in slot 120 such that post 24 is not aligned with throat 118. Consequently, post 24 cannot become dislodged from slot 120. Conversely, if post 24 is aligned with throat 118, knobs 38 and 40 are projecting into windows 122 and 124, again inhibiting disconnection of fastener 10 from first component 12. Therefore, fastener 10 can be designed with significant movement to compensate for thermal expansion or contraction without compromising the secure attachment of fastener 10 to first component 12.

Standoff ribs 94 and 96 provide the proper positional relationship for second component 14 relative to wings 72 and 74. Thus, second component 14 is held snuggly between wings 72 and 74 on one side and standoff ribs 94 and 96 on an opposite side. Standoff ribs 94 and 96 also control or limit the compression of sealing member 98, if the sealing member is used.

Double-ribbed center portion 70 provides structural support for wings 72, 74, shear load strength and design flexibility. Shear ribs 88 and 90 protect wings 72, 74 if shear load is applied to fastener 10 against opening 130 in second component 14 prior to knobs 38 and 40 disengaging from windows 122 and 124 during thermal expansion or contraction.

The tapered orientation of second component connecting end 18, with wings 72 and 74 angling outwardly from tip 76 provides an initially narrow structure for finding and entering opening 130, thus facilitating location during blind assembly. Two independent slots 80 and 82 at tip 76 provide ergonomic benefits during assembly by reducing the load requirement for insertion of fastener 10 through opening 130. Wings 72 and 74 function relatively independently for deflection as required. Center pin 78 supports and maintains the function of independent deflection for wings 72 and 74 if extraction force is applied to fastener 10 relative to opening 130 in second component 14. Center pin 78 also acts as a lead-in guide feature for fastener 10 entering opening 130.

The present invention provides a fastener that secures easily to first and second components and requires minimal orientation. The fastener is allowed to float during assembly and under conditions of extreme thermal expansion or contraction to minimize damage to components secured thereto. The present invention provides a fastener that can be manufactured economically by known and established manufacturing techniques.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A faster for joining a first component to a second component said faster comprising:
    a first connecting and configured for connection to a first component and a second connecting end configured for connection to a second component;
    said first connection and including a base and a plate in spaced relation and a post connected to and extending between said base and said plate;
    said plate having deflectable end portions on opposite ends thereof, and a surface facing said base;
    first and second knobs projecting from said surface at said first and second deflectable end portions, respectively;
    each said knob having at angular outer face and an angular inner face.

2. The fastener of claim 1, including an intermediate structure between said first connecting end and said second connecting end.

3. The faster of claim 2, said second connecting end having a collar end said intermediate structure connected between said collar and said plate.

4. The faster of claim 3, said collar having standoff ribs for engaging a second component joined to said second component connecting end.

5. The fastener of claim 4, including a sealing member on said collar between at lease two said standoff ribs.

6. The fastener of claim 1, each said knob having first and second side faces between said angular inner and outer face thereof and at least on said side face on each said knob being substantially perpendicular to said surface.

7. The fastener of claim 6, each said side face on each said knob being substantially perpendicular to said surface.

8. The fastener of claim 6, said tip defining first and second slots and a center pin between said slots, and said wings being connected to said tip along outer segments of said first and second slots.

9. The fastener of claim 1, said second component connecting end including a center portion a tip on said center portion and first and second wings connected to said tip.

10. A fastener assembly comprising:
    a first component having a slot and a window; and
    a fastener having a first component connecting and connected to said first component, a second component connecting end spaced from said first component connecting end, an intermediate structure between said first component connecting end and said second component connecting end, an intermediate collar between said second component connecting end and said intermediate structure, said first component connecting end including:
    a base on one side of said first component;
    a plate in spaced relation to and beneath said base, said plate being disposed on an opposite side of said first component from said base;
    a post connected to and extending between said base and said plate, said post being disposed in said slot;
    a knob projecting from a surface on said plate, toward said base and away from said intermediate collar, said knob being disposed in said window, said knob having a angular inner face and a angular outer face and first and second side faces, at least one said side face being perpendicular to said plate.

11. The fastened assembly of claim 10, said first component having an edge, an entrance to said slot along said edge and a ramp from said edge toward said window.

12. A fastened assembly comprising:
    a first component having a slot, a window and a second window; and
    a fastener having a first component connecting end connected to said first component, said first component connecting end including:
    a base on one side of said first component;
    a in spaced relation to said base, said plate being disposed on an opposite side of said first component from said base;
    a post connected to and extending between said base and said plate, said post being disposed in said slot,
    a knob on said plate disposed in said window, said knob having an angular inner face and an angular outer face and first and second side faces, at least one said side face being substantially perpendicular to said plate;

said plate having first and second deflectable ends, said knob disposed on one of said deflectable ends and other knob disposed on the other of said first and second deflectable ends, said other knob being disposed in said second window.

13. The fastened assembly claim 12, said first component having an edge, an entrance to said slot along said edge and first and second ramps from said edge toward said first and second windows, respectively.

14. The fastened assembly of claim 13, said fastener having a second component connecting end and a second component connected to said second component connecting end.

15. The fastened assembly of claim 14, said second component connecting end having a center portion and a collar, and said fastener including an intermediate structure between said plate and said collar.

16. The fastened assembly of claim 15, said collar including standoff ribs engaged against said second component.

17. The fastened assembly of claim 16, said second component connecting end including a sealing member around said center portion, against said collar and between said standoff ribs.

18. The fastened assembly of claim 17, said second component connecting end including a tip, first and second lateral wings connected to said tip and second slots extending inwardly from an outer edge of said tip, said first and second lateral wings being independently deflectable.

19. An assembly for securing first and second components to each other, said assembly comprising:
   a first component including:
      a panel segment with an edge;
      a keyhole opening in said panel including an entrance thereto along said edge and a slot opening from said entrance;
      first and second window on opposite ends of said slot and spaced from said slot; and
      first and second ramp along said edge aligned with said first and second window, respectively; and
   a fastener having a first component connecting and connected to said first component, and a second component connecting end configured for connection to a second component, said first component connecting end including:
      a base on one side of said panel segment;
      a plate in spaced relation to said base, said plate being disposed on an opposite side of said panel segment from said base, said plate having first and second deflectable portion;
      a post connected to and extending between said base and said plate, said post being disposed in said slot; and
      first and second knobs on said first and second deflectable portions, said knobs being disposed in said first and second windows, respectively, end said knob having an angular inner face ad a angular outer face substantially aligned with said windows and said slot, mud each said knob having a first side face and a second side face extending between said inner and outer faces of said knob, at least one said side face on each said knob being substantially per perpendicular to said plate.

20. The assembly of claim 19, said entrance having a throat having a width interfering with said post sliding therethrough.

21. The assembly of claim 19, said second component connecting end having a collar, a scaling member against said collar, and standoff ribs on said collar for engaging a second component and limiting compression of said sealing member.

22. The assembly of claim 19, both said side face on both said knots being substantially perpendicular to said plate.

* * * * *

UNITED STATES PATENT AND TRADEMARK OFFICE
CERTIFICATE OF CORRECTION

PATENT NO. : 7,152,281 B2
APPLICATION NO. : 11/116864
DATED : December 26, 2006
INVENTOR(S) : Derek Scroggie It is certified that error appears in the above-identified patent and that said Letters Patent is hereby corrected as shown below:

Col. 7, line 56 in claim 1, line 3, delete "and", and in its place insert --end--.
Col. 7, line 58 in claim 1, line 6, delete "connection and", and in its place insert --connecting end--.

Col. 8, line 5 in claim 3, line 2, delete "end", and in its place insert --and--.

Col. 8, line 13 in claim 6, line 2, delete "face", and in its place insert --faces--.
Col. 8, line 14 in claim 6, line 3, between "thereof" and "and", insert -- , --.

Col. 8, line 23 in claim 9, line 2, between "portion" and "a", insert -- , --.

Col. 8, line 27 in claim 10, line 3, delete "and", and in its place insert --end--.

Col. 8, line 58 in claim 12, line 8, between "a" and "in", insert --plate--.

Col. 9, line 33 in claim 19, line 5, beween "panel" and "including", insert --segment--.
Col. 9, line 37 in claim 19, line 8, delete "window", and in its place insert --windows--.
Col. 10, line 1 in claim 19, line 10, delete "ramp", and in its place insert --ramps--.
Col. 10, line 3 in claim 19, line 12, delete "and", and in its place insert --end--.
Col. 10, line 12 in claim 19, line 21, delete "portion", and in its place insert --portions--.
Col. 10, line 18 in claim 19, line 27, delete "end", and in its place insert --each--.
Col. 10, line 19 in claim 19, line 28, delete "ad a", and in its place insert --and an--
Col. 10, line 21 in claim 19, line 30, delete "mud", and in its place insert --and--.

Col. 10, line 30 in claim 21, line 2, delete "scaling", and in its place insert --sealing--.

UNITED STATES PATENT AND TRADEMARK OFFICE
CERTIFICATE OF CORRECTION

PATENT NO. : 7,152,281 B2
APPLICATION NO. : 11/116864
DATED : December 26, 2006
INVENTOR(S) : Derek Scroggie It is certified that error appears in the above-identified patent and that said Letters Patent is hereby corrected as shown below:

Col. 10, line 34 in claim 22, line 1, delete "face", and in its place insert --faces--.

Signed and Sealed this

Third Day of April, 2007

JON W. DUDAS
*Director of the United States Patent and Trademark Office*